Patented Feb. 27, 1945

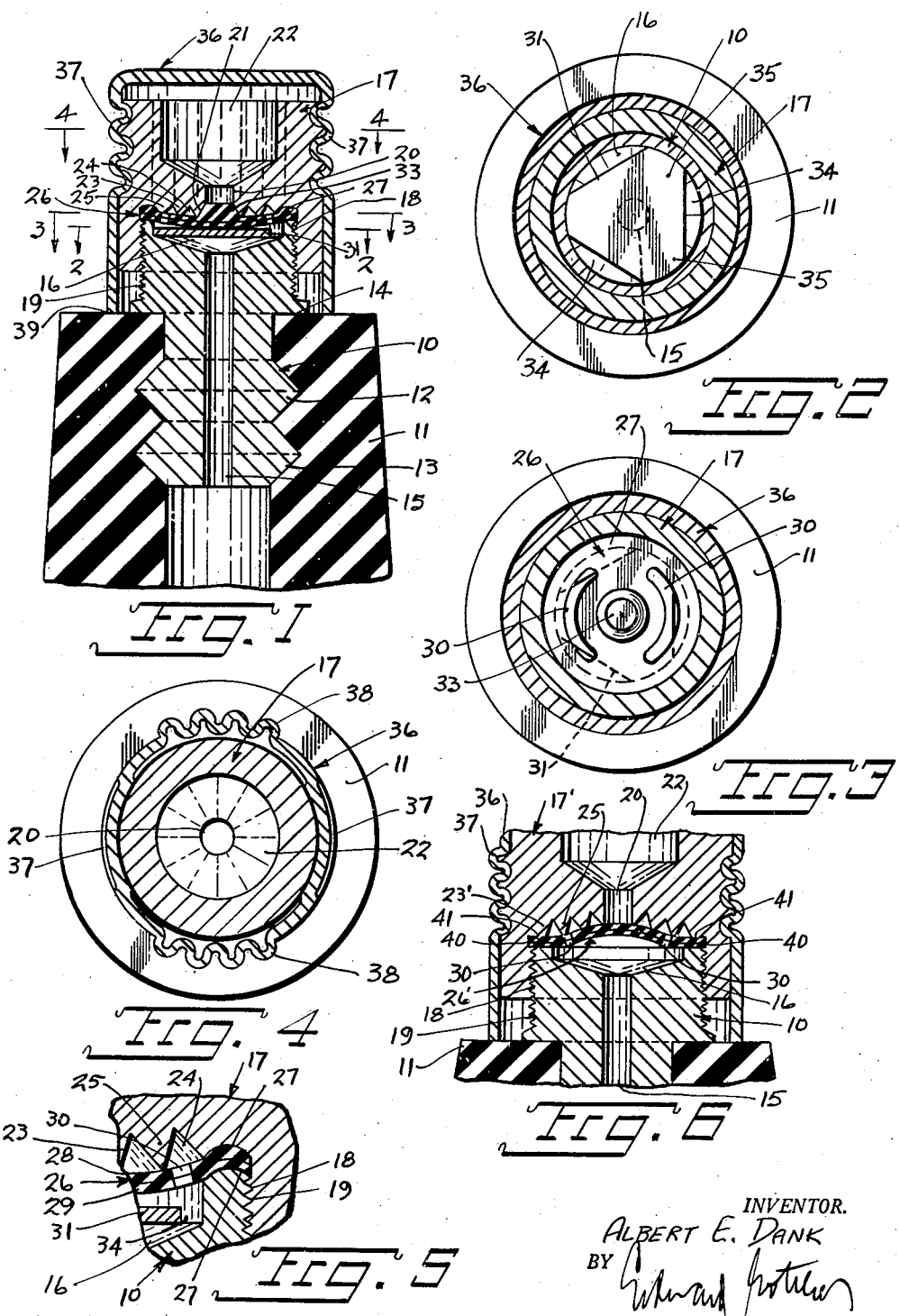

2,370,451

UNITED STATES PATENT OFFICE 2,370,451

TIRE VALVE

Albert E. Dank, Baltimore, Md., assignor to Assembled Products Co., Baltimore, Md.

Application December 7, 1943, Serial No. 513,218

9 Claims. (Cl. 251—119)

This invention relates to new and useful improvements in tire valves.

The basic construction of tire valves has not been varied or improved in years. Yet, inherent defects are generally known. The use of the helical spring to engage the valve head upon its seat is poor in that there is no reserve factor for seating the valve head when dirt and grit engage between the valve head and seat. This invention proposes a new construction in which dust, dirt and grit may reach the valve proper and yet the valve proper will exclude the leakage of air.

Moreover, the new valve construction is not only more positive in action but actually has less weight and uses less material and fewer parts than prior similar valves. Applicant also proposes so constructing the valve that less labor is required in its manufacture.

The dominating feature of the improved valve resides in the provision of a washer-like valve proper extending across sharp annular ridges and fixedly supported and clamped at its edge portions between the edge portions of a stem and a nut, and having one or more small air passages slightly inwards of its supported and clamped edge portion so as to be capable of closing against said sharp annular ridges and cutting off the passage of air, and being openable when desired to permit the flow of air. In one form the invention also proposes the provision of a sheet-like spring cooperative with said washer-like valve to urge it into its closed position.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a vertical central sectional view of a tire valve constructed in accordance with this invention.

Fig. 2 is a horizontal sectional view taken on the line 2—2 of Fig. 1.

Fig. 3 is a horizontal sectional view taken on the line 3—3 of Fig. 1.

Fig. 4 is a horizontal sectional view taken on the line 4—4 of Fig. 1.

Fig. 5 is a fragmentary enlarged detailed view of a portion of Fig. 1.

Fig. 6 is a fragmentary sectional view similar to Fig. 1 but illustrating a modified construction.

The tire valve, in accordance with this invention, as illustrated in Figs. 1 to 5, includes a stem 10 for permanent mounting in the rubber nipple 11 of an inner tube or the like part. The stem 10 is formed with several external beaded or rib-like portions 12 about which the material of the nipple 11 may engage for more effective adhesion of these parts by vulcanization. Between the beaded portions 12 there are grooved portions 13 into which the rubber material engages to more securely hold the parts together. The stem 10 is also formed with a shoulder 14 engaged intimately against the outer end of the nipple 11.

An axial passage 15 extends through the stem 10. This passage connects with a concave-like recess 16 formed in the outer end of the stem 10. This recess 16 is of frusto-conical form, though other forms could be used with equal results. A nut 17 has internal threads 18 by which it is threadedly mounted on the external threads 19 formed on the outer portion of the stem 10. The nut 17 has an axial passage 20 formed with a small frusto-conical portion 21 at its bottom end and with a large cylindrical portion 22 at its top end. A downwardly directed convex wall 23 surrounds the small frusto-conical inner portion 21 of said passage 20 through the nut 17. This convex wall 23 is formed with a plurality of concentric grooves 24 dividing off or forming downwardly directed sharp annular ridges 25. The convex wall 23 and consequently, the concentric grooves 24 and annular ridges 25 are opposed to the concave recess 16.

A flat washer-like valve proper 26 extends across said sharp annular ridges 25 and is fixedly clamped in concaved condition against said convex wall 23, at its edge portions, between the edge portions of the stem 10 and the edge portions of said convex wall 23. More specifically, these clamping portions are formed with inter-engaging projecting surfaces and recessed surfaces 27 preferably of V-shape in transverse cross sections, or of other shapes which will not only firmly clamp the edge portions of the washer-like valve proper 26 in position, but which will also direct and hold the washer-like valve proper 26 arched arcuately (concaved) along the contour of the convex shaped wall 23 so that it resiliently bares against said sharp ridges 25. The washer-like valve proper 26 has a top layer 28 of relatively soft rubber and a bottom layer 29 of harder rubber or plastic material. One or more small air passages 30 extend through the washer-like valve proper 26 slightly inwards of the clamped edge portions thereof. These small air passages 30 are shown of arcuate axial shapes. They are for the purpose of allowing air which reaches the outer circumferential portions of the washer-like valve proper to pass through.

A sheet-like spring 31 is disposed within said concave-like recess 16 and engages against and urges and assists in engaging said valve proper 26 against said convex wall 23. More specifically, the sheet-like spring 31 is assisting in urging the soft material 28 of the valve proper 26 against the sharp ridges 25 of the said wall 23. At its center the washer-like valve proper 26 is formed with a frusto-conical portion 33 which engages within and closely fits the said small frusto-conical inner portion 21 of the passage through the nut 17. The sheet-like spring 31 is triangularly shaped (see Fig. 2) so that there are air passages 34 between its sides and the sides of the concave-like recess 16 to permit the passage of air. The apex portions of the sheet-like spring 26 are formed with rounded edge portions 35 which rest against the side shoulders of the concave-like recess 16 by which the sheet-like spring 31 is firmly supported. The function of this sheet-like spring 31 is to urge the valve proper 26 into its closed position for assisting in closing the valve.

A cap 36 is removably mounted over the nut 17 and against the end of the nipple 11. This cap 36 is produced from sheet metal by means of a stamping process. After it is drawn into cap shape, thread-like impressions 37 are formed on diametrically opposite sides and are cooperative with threads formed externally upon the nut 17 to hold the cap 36 in position. The remaining two sides of the cap 36 are formed with longitudinally extending corrugations 38 or knurlings by which the cap 36 may be firmly gripped by the fingers. The edge 39 of the cap 36 engages against the end of the nipple 11 to keep dust, dirt and grit out of the tire valve.

The operation of this new tire valve is as follows:

As shown in Fig. 1, the valve is in its closed position. The sheet-like spring 31 is forcing the washer-like valve proper 26 towards the wall 23 so that it is forced against the ridges 25. The washer-like valve proper 26 also engages the ridges 25 due to its own resiliency. Moreover, the air pressure within the inner tube which connects with the nipple 11 and the passage 15 engages beneath the sheet-like spring 31 and beneath the washer-like valve proper 26 to assist in firmly holding the valve proper in its closed position. The cap 36 prevents dust, dirt and grime from entering the tire valve.

When it is desired to use the tire valve, the cap 36 is unscrewed. The usual air hose with the usual air hose valve may be engaged on the outer end of the nut 17 so that the pin in the air hose engages against the frusto-conical projection portion 33 of the washer-like valve proper 26 for assisting in opening the valve. The air pressure in the hose line will also act against the frusto-conical projection 33 and the top face of the washer-like valve proper 26 for assisting the opening of the valve. The air is then free to flow through the small air passages 30 and through the passage 15 of the stem 10. The pressure within the tire may be released by forcing the usual pin against the frusto-conical projection 33 of the washer-like valve proper 26.

An important feature of the new valve construction resides in the fact that if dirt and grit are blown into the valve, or in other ways reaches the valve, and comes to rest upon the washer-like valve proper 26, it will not render the valve leaky. The dust, dirt and grime will be forced up into the grooves 24. The sharp ridges 25 will always be free to engage against the top of the washer-like valve proper 26. Even if a particle of sand or other gritty substance engages upon an edge of the ridges 25, the valve still will not leak since there are a plurality of other ridges 25 which can cooperate with the soft and resilient top material of the washer-like valve proper 26 to firmly seal and close the valve.

From the above explanation it will be seen that the valve is more durable in operation and has a lesser tendency to become leaky than present day tire valves. Moreover, it is estimated that about 40% less material is required in construction of the new valve, and at least 60% less labor required in constructing and assembling the valve.

In Fig. 6 another form of the invention has been disclosed which distinguishes from the prior form essentially in the way in which the flat washer-like valve proper 26' extends across the sharp annular ridges 25 of the concave wall 23' of the nut 17' and is urged against said sharp ridges due to its inherent resiliency. More specifically, the flat washer-like valve proper 26' normally is flat when separated from the nut 17'. It is of a slightly larger diameter than the diameter of a groove 40 formed internally of said nut 17' at the inner ends of the threads 18 of said nut. The groove 40 is of a diameter substantially equal to the base diameter of the internal threads 18 so that the flat washer-like valve proper 26' must be flexed when it is engaged into the nut 17' and then has inherent resiliency. Due to its inherent resiliency the washer-like valve proper will maintain its position in the groove 40 so that the nut 17' and the valve proper 26' are combined as a unit. Furthermore, due to its inherent resiliency, the valve proper 26' will exert pressure against the annular sharp ridges 25 which then constitutes the closed position of the tire valve. When the nut 17' is screwed upon the stem 10 the edge portions of the washer-like valve proper 26' will be firmly clamped and held at its edge portions. One of these clamping surfaces is also formed with a sharp annular projection 41 assisting in gripping and holding the edge portion of said washer-like valve proper 26'.

In other respects this form of the invention is identical to the preferred form, and like parts are indicated by like reference numerals.

It should be noted that in this form of the invention there is no need for a sheet-like spring acting against the washer-like valve proper 26' to assist in urging it into its closed position.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess and the sharp edges of said ridges being disposed in a curve, and a washer-like valve proper extending across said sharp annular ridges and fixedly supported at its edge portions and resiliently engaging against said sharp annular ridges for closing the tire valve and having one or more small air passages slightly inwards of its edge portions for the passage of air when said valve proper is open, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges.

2. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess, and a washer-like valve proper extending across said sharp annular ridges and fixedly supported at its edge portions and resiliently engaging against said sharp annular ridges for closing the tire valve and having one or more small air passages slightly inwards of its edge portions for the passage of air when said valve proper is open, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges.

3. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess, and a washer-like valve proper extending across said sharp annular ridges and fixedly supported at its edge portions and resiliently engaging against said sharp annular ridges for closing the tire valve and having one or more small air passages slightly inwards of its edge portions for the passage of air when said valve proper is open, said curved wall being concavely curved, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges, and said washer-like valve proper having a soft layer engaging said annular ridges.

4. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess in the outer end of said stem, and a washer-like valve proper extending across said sharp annular ridges and fixedly supported at its edge portions and resiliently engaging against said sharp annular ridges for closing the tire valve and having one or more small air passages slightly inwards of its edge portions for the passage of air when said valve proper is open, said curved wall being convexly curved, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges, and said washer-like valve proper having a soft layer engaging said annular ridges and a hard back layer for resiliently urging said soft layer against said annular ridges.

5. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess, and a washer-like valve proper extending across said sharp annular ridges and fixedly supported at its edge portions and resiliently engaging against said sharp annular ridges for closing the tire valve and having one or more small air passages slightly inwards of its edge portions for the passage of air when said valve proper is open, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges, and a sheet-like spring acting against said washer-like valve proper for assisting in urging said washer-like valve proper against said sharp annular ridges and being freely rested within said concaved-like recess in the outer end of said stem and supported by its edges engaging the edges of said concaved-like recess.

6. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess, a washer-like valve proper extending across said sharp annular ridges and fixedly clamped at its edge portions between the edge portions of said stem and the edge portions of said curved wall and having one or more small air passages slightly inwards of the clamped edge portions, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges, and a sheet-like spring within said concave-like recess and engaging and urging said valve proper closed against said curved wall; said washer-like valve proper having a soft top surface and a relatively harder bottom surface, and said bottom surface being engaged by said spring.

7. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess, a washer-like valve proper extending across said sharp annular ridges and fixedly clamped at its edge portions between the edge portions of said stem and the edge portions of said curved wall and having one or more small air passages slightly inwards of the clamped edge portions, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges, and a sheet-like spring within said concave-like recess and engaging and urging said valve proper closed against said curved wall, said spring being triangularly shaped to provide passages along the sides for the air and to provide supporting portions at three points.

8. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess, a washer-like valve proper extending across said sharp annular ridges and fixedly clamped at its edge portions between the edge portions of said stem and the edge portions of said curved wall and having one or more small air passages slightly inwards of the clamped edge portions, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges, and a sheet-like spring within said concave-like recess and engaging and urging said valve proper closed against said curved wall, said spring being triangularly shaped to provide passages along the sides for the air and to provide supporting portions at three points, and the apexes of said triangularly shaped sheet-like spring being rounded and engaging the side shoulders of said concave-like recess.

9. A tire valve, comprising a stem for permanent mounting in the rubber nipple of an inner tube or the like part and having an axial passage connecting with a concave-like recess in the outer end of said stem, a nut mounted on the outer end of said stem and having an axial passage formed with an inner portion surrounded by a curved wall having a plurality of concentric grooves forming downwardly directed sharp annular ridges opposed to said concave recess, a washer-like valve proper extending across said sharp annular ridges and fixedly clamped at its edge portions between the edge portions of said stem and the edge portions of said curved wall and having one or more small air passages slightly inwards of the clamped edge portions, the edge portions of said washer-like valve proper being set into a groove formed within said nut, and said washer-like valve proper being of a larger diameter than the diameter of said groove, whereby when it is forced into said groove it maintains a curved condition resiliently acting against said annular ridges, and a sheet-like spring within said concave-like recess and engaging and urging said valve proper closed against said curved wall, said edge portions of said stem and said edge portions of said curved wall which clamp the edge portions of said washer-like valve proper being formed with angularly directed interengaged surfaces which assist in holding and directing said washer-like valve against said curved wall.

ALBERT E. DANK.